United States Patent Office 3,506,742
Patented Apr. 14, 1970

3,506,742
TERMINALLY ACTIVE LIQUID DIOLEFIN POLYMERS, PREPARATION AND VULCANIZATES THEREOF
Ernest Jack Buckler and Douglas Cameron Edwards, Sarnia, Ontario, Richard Helmut Wunder, Corunna, Ontario, and John Beaton, Sarnia, Ontario, Canada, assignors to Polymer Corporation Limited, Sarnia, Ontario, Canada, a body corporate and politic
No Drawing. Continuation-in-part of application Ser. No. 559,733, June 23, 1966. This application May 6, 1968, Ser. No. 727,039
Claims priority, application Canada, Aug. 9, 1965, 937,644, 937,645
Int. Cl. C08d 1/36, 3/04, 3/06
U.S. Cl. 260—889         16 Claims

ABSTRACT OF THE DISCLOSURE

Difunctional liquid polymers of conjugated diolefins are prepared in an emulsion polymerization system in the presence of free radical catalyst and polyhalo chain transfer agents.

These liquid polymers vulcanize with polyfunctional vulcanizing agents, such as polyfunctional amines to form solid elastomers. When rapid vulcanization at room temperature is required, tertiary aliphatic polyamines are used. Slower cures and thermally stable vulcanizates are obtained with heterocyclic polyamines.

---

This invention is a continuation-in-part of our copending United States application Ser. No. 559,733 filed June 23, 1966, and now abandoned, entitled "Polymerization Process and Products" and claims with respect to said above application two convention priorities in Canada each of Aug. 9, 1965, and claims with respect to certain new matter a convention priority in Canada of May 18, 1967 by way of a supplementary disclosure in Canada.

This invention relates to terminally-active liquid polymers of diolefinic hydrocarbon monomers and to vulcanizates of these polymers.

In this specification, "liquid" polymers are defined broadly as polymers having intrinsic viscosities in toluene at 30° C. of about 0.04–1.0, and "vulcanizates" are the reaction product of the liquid polymer with compounds having a functionality of two or more and which are capable of joining together molecules of the liquid polymer.

Terminally-active polymers have previosuly been prepared by processes such as (a) condensation reactions of monomers containing the active end groups to produce alpha-omega difunctional polymer molecules, (b) anionic polymerization of unsaturated monomers with organo-alkali metal initiators such as organo-lithium compounds to form polymers containing terminal alkali metal atoms, then replacing the alkali metal atoms with reactive groups, and (c) degrading a preformed polymer in solution under conditions which provide the ends of the polymer fragments at the points of chain scission with chemically reactive groups. While these products and processes have been employed with varying degrees of success as bases for sealants, caulking compounds, rocket fuel binders, etc., alternate and simpler products and processes are deemed to be desirable to produce products having improved properties and to reduce the cost problems variously characteristic of the prior processes. The novel vulcanizates of the present invention are relatively inexpensive, can be prepared at room temperature and have good adhesion to glass, metals and wood.

One aspect of the present invention comprises an aqueous emulsion polymerized undegraded olefinically unsaturated liquid polymer composition containing molecules comprising a polymerized $C_4$–$C_8$ diolefinic hydrocarbon compound, a major proportion of said molecules being characterized by the presence of two separated

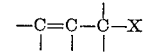

structures within their molecular structures, where X is a halogen atom selected from the group consisting of chlorine, bromine and iodine, said liquid polymer composition being characterized by an intrinsic viscosity within the range of 0.04–1.0 when measured in toluene at 30° C.

The novel polymers of the present invention may be vulcanized and it is in this relation that another aspect of the invention deals with vulcanization of the novel polymers with multifunctional compounds, especially multifunctional amines. Yet another aspect of the invention relates to vulcanizates of the novel polymers whereby the improvement of thermal stability is achieved.

The liquid polymer compositions may be prepared by a process comprising causing a monomer system comprising a $C_4$–$C_8$ diolefinic hydrocarbon compound to polymerize under aqueous emulsion polymerization conditions in the presence of at least about 0.15 mole per 100 moles of monomer, of a compound of the type X(Y)Z where X is Br, I or Cl; Z is —$CBr_3$, —$CCl_3$, —$Cl_3$, or >$Cl_2$; Y is a radical having a structure selected from the group consisting of

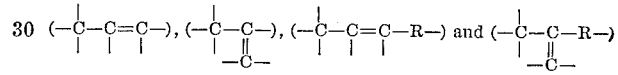

where R is a hydrocarbon or substituted hydrocarbon radical having a molecular weight of from 14 up to about 1000, to obtain a latex of said polymer and recovering the polymer from said latex.

The liquid polymer compositions are substances ranging in consistency from pourable liquids to highly viscous or Vaseline-like materials at room temperature. They have intrinsic viscosities as measured in toluene at 30° C. ranging from 0.04 to 1.0 and preferably from 0.05 to 0.6. Although the ideal polymer compositions are characterized by the presence of an allylic halogen atom at or near each end of every polymer molecule, large scale commercial practice may make the ideal impractical of attainment since not all molecules may be so characterized. It has been found that excellent properties may be obtained with compositions wherein only a major proportion of the molecules are thus characterized with the remaining molecules being monofunctional, i.e. having only one terminal group containing an allylic halogen atom and including the possible presence of a minor proportion which may be halogen-free in the terminal groupings.

The presence of the allylic halogen atoms at or near the terminal carbon atoms of the polymer chains imparts a considerable degree of vulcanization acivity to the polymers when contacted with multifunctional compounds, i.e. compounds having a functionality of two or more such as multifunctional amines which are capable of reacting with the halogen atoms to cause a linking of the polymer molecules and thus convert the liquid polymers into elastomeric end products. Broadly, the halogen content of the unvulcanized polymers will fall within the range of 1 to 15 weight percent of the total weight of the polymer composition and preferably within the range of 1.5 to 10 weight percent.

Depending on the molecular weight of the raw polymer and the manner in which it has been compounded, the compositions may be subject to cold flow on standing prior to vulcanization. In some applications, this characteristic of cold flow may be undesirable and may be overcome by the additional incorporation of 5–20 parts by weight of materials which impart thixotropic properties to the polymer compositions.

Materials such as polyethylene, polypropylene and trans-polyisoprene have been found to be suitable. For example, about 10 parts of polyethylene per 100 parts by weight of a polymer having an intrinsic viscosity of about 0.4 effectively eliminates cold flow with the composition still retaining its softness and easy-working character. These materials may be incorporated directly in the liquid polymer or by adding as a solution in or mixture with a solvent such as an oil which is compatible with the liquid polymer.

As specified earlier, a portion of the liquid polymer's molecular structure is comprised of a polymerized $C_4$–$C_8$ dienic hydrocarbon compound. Preferably the polymerized diene forms a major proportion of the polymer. More than one dienic hydrocarbon compound may be employed to form the dienic portion of the liquid polymers, and when the polymer is a copolymer of a diolefin and a monoolefin, more than one monoolefinic monomer may be used to form the non-dienic portion of the polymer. The $C_4$–$C_8$ dienes which may be employed include conjugated dienes such as butadiene-1,3; 2-methyl butadiene-1,3; pentadiene-1,3; hexadiene-1,3; 2,3-hexadiene-1,3; 2-chloro-butadiene-1,3 and 2,3-dimethyl butadiene-1,3 with butadiene-1,3 being preferred. The monoolefinic monomers include compounds such as styrene, acrylonitrile and methyl methacrylate. Of the various liquid homopolymers and copolymers which may be prepared by the process of this invention, those containing a major proportion of polymerized butadiene-1,3 are preferred.

In preparing the halogen-containing liquid polymers, the polymerizable monomer system is emulsified in water and caused to polymerize in the presence of a compound of the type $X(Y)Z$ where X is Br, I or Cl; Z is $-CBr_3$, $-CCl_3$, $-CI_3$ or $>CI_2$; Y is a radical having a structure selected from the group consisting of

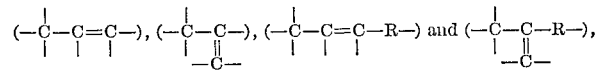

where R is a hydrocarbon or substituted hydrocarbon radical having a molecular weight of from 14 up to about 1000. While the $X(Y)Z$ type compound is thermally decomposable to form free radicals capable of intiating the polymerizaiton of the monomers, the polymerization is preferably initiated by the decomposition of free radical forming compounds of the conventional type employed in aqueous emulsion polymerization such as the peroxygen initiators. The amount of the $X(Y)Z$ type compound required to be used will vary depending on the type of compound employed and the viscosity desired in the halogen-containing liquid polymer which is to be prepared. The amount should be at least 0.15 mole of compound per 100 moles of monomer. While more may be used, the amount generally will not exceed about 6.5 moles per 100 moles of monomer. As indicated earlier, the type of compound, i.e. the degree of its activity, will be a determining factor regarding the amount employed since not all compounds are equally active. For example, when the $X(Y)Z$ halogen compound is of the type $Br_3C$-(polybutadiene-1,3 radical)-Br where the polybutadiene-1,3 radical is 2–10 butadiene units long with the butadiene being polymerized through the 1 and 4 carbon atoms, at least 0.5 mole should be employed and preferably 0.8–6.5 moles when the monomer system to be polymerized consists of butadiene-1,3 only. When the compound is of the type $HI_2C$-(polybutadiene-1,3 radical)-I where the radical and the monomer system are each as described for the preceding example, at least 0.15 mole of compound should be used and preferably 0.25–2.0 moles since this compound is more active. The foregoing compounds will result in the production of excellent liquid polymers. The required proportion for each combination of halogen compound and polymerizable monomer system can be easily determined by simple preliminary testing.

When employing anionic emulsifiers for the polymerization reaction, it may be desireable to include a buffering compound to maintain the pH of the system alkaline. If desired, there may also be present a small amount of $C_{12}$–$C_{16}$ mercaptan. Examples of suitable conventional polymerization initiators are cumene hydroperoxide, diisopropylbenzene hydroperoxide, azo-bis - isobutyronitrile, potassium persulfate and sodium persulfate and the amount used may vary widely, e.g. 0.1–5.0% by weight of the monomers. The presence of the $X(Y)Z$ type compound is essential during the polymerization reaction for the formation of the halogen-containing liquid polymers of the present invention.

The polymerization reaction may be carried out broadly speaking at any temperature from about 5° C. to about 80° C. or higher. The use of redox (reduction-oxidation) reactions for the initiation of polymerization is usually carried out at temperatures of about 5–45° C. and preferably about 5–20° C. When the polymerization is to be initiated by thermal decomposition of initiators such as potassium persulfate, temperatures in the range of 45–80° C. are most convenient and preferably in the range of 50–70° C. Additionally and surprisingly, it has been discovered that with redox systems at 5–45° C. practically no polymerization is obtained until the usual 1.5–2/1 water/monomer ratio employed in aqueous emulsion polymerizations is increased to about 3–4/1 or higher. Product properties such as tensile strength and solgel behaviour of the vulcanizates are improved progressively with increase in the conversion to which the monomer polymerization is taken. They appear to be best at 100% conversion when butadiene-1,3 is the sole monomer. It has also been discovered that post-heating of low conversion material will result in an up-grading of the strength properties of the vulcanized product if the heating is carried out after removing the unreacted monomer. Post-heating temperatures of the order of 45–60° C. appear to be suitable.

The compounds described by the $X(Y)Z$ designation may be prepared by any convenient method. One very satisfactory method is to prepare a mixture of a $C_4$–$C_8$ acyclic diolefinic hydrocarbon compound, preferably butadiene-1,3, a tri- or tetra-halogen substituted methane where the halogen is selected from the group consisting of chlorine, bromine and iodine, preferably tetrabromomethane, and an oil-soluble free-radical generating compound such as benzoyl peroxide, cumene hydroperoxide and azo-bis-isobutyronitrile and heating the mixture at a free-radical generating temperature to form the desired compound. For example, a mixture of 100 parts by weight butadiene-1,3, 40 parts tetrabromomethane and 0.5 part of benzoyl peroxide when heated at 60° C. for 1 hour produces a suitable compound having the structure $Br_3C$-(polybutadiene-1,3 radical)-Br. The unrefined product can be used as obtained for the polymerization of the liquid polymers or it can be purified by venting off any unreacted butadiene-1,3 and extracting with acetone or alcohol or steam distilling any unreacted tetrabromomethane before addition to the polymerization system. Another method is simply to emulsify in water the monomer system to be polymerized containing the diolefin, the tetrabromomethane and the oil-soluble or water-soluble free-radical generating compound and any other materials desired to be present such as a buffering compound and an activator for free-radical generation and agitating the emulsion to form the compound in situ prior to and during the polymerization reaction for the liquid polymer formation. Excellent liquid polymers are produced by both methods.

After the polymerization reaction has been completed, the halogen-containing liquid polymer is recovered by coagulation from the latex in which it is obtained. The usual method of recovering solid rubbery polymers from their latexes is to first subject the latex to a stripping step to remove unreacted monomers, then to coagulate the polymers by mixing the latex with an aqueous solution of an ionizable salt and/or acid and finally to filter off, water-wash and dry the coagulated polymer. This procedure is not very satisfactory for the liquid polymers in the present case since it does not provide for the removal of low molecular weight monofunctional molecules which are also usually formed and which interfere with subsequent curing operations to which the liquid polymers are subjected. Thus the full potential of the properties of the liquid polymers cannot be realized. It has been found that if prior to drying, the coagulated liquid polymer is given a wash with a material such as acetone or a low molecular weight alcohol such as ethanol in which the low molecular weight monofunctional cure-interfering fraction is soluble but in which the difunctional higher molecular weight liquid polymer is insoluble, a very satisfactory product is obtained. Another satisfactory but more expensive method of purification is to subject the polymer to one or more acetone or alcohol precipitations from solution in a solvent such as benzene or toluene.

The liquid polymers of the present invention can be readily "cold" cured, that is, vulcanized, into solid rubbery products at ambient temperatures, usually 15–35° C., with multifunctional compounds, such as multifunctional amines, which are capable of reacting with the allylic halogen atoms. With multifunctional amines, which are the preferred curing agents, cure can be effected in times as short as a few minutes or as long as a few hours or even days, depending on the activity of the amine and the polymer, the temperature level, the amount and type of amine employed, etc. The amount of amine used will normally be in the range of about 0.5–15 weight percent per 100 parts of polymer and preferably in the range of about 1–10 weight percent. Aliphatic, cycloaliphatic, and aromatic amines having primary, secondary or tertiary amine groups are capable of effecting vulcanization of the liquid polymers to solid rubbery vulcanizates. Amines containing only one nitrogen atom are applicable if the nitrogen atom is joined to one or more hydrogen atoms, but in general amines containing two or more nitrogen atoms are preferred for vulcanization. Mixtures of amines may also be used.

If particular prevulcanization properties are desired, such as increased "pot life," then a difunctional chain extending agent may be used in admixture with the multifunctional vulcanizing agent. "Pot life" is defined in this invention as the time taken for a mix to thicken to an unworkable condition. Thus an increased "pot life" may be obtained by employing a difunctional chain extending agent such as 1,3-di-4-pyridyl propane in combination with a primary amine, for example, hexamethylene diamine or a secondary amine, for example 1,3-di-4-piperidyl propane. The amine may comprise at least one of an aliphatic amine, aromatic amine or mixture thereof.

It has also been found that by selecting the multifunctional compounds from secondary and tertiary heterocyclic amines, not only is especially good "pot life" experienced with the vulcanizable mixture, and also an effective cure therewith, but it has further been found that improved thermal stability of the vulcanizate is made possible when compared to a corresponding vulcanizate prepared using an aliphatic amine. In this specification, "thermal stability" is defined as the resistance of the vulcanizate to reversion upon exposure to elevated temperatures, and a useful measurement for this criterion is the percent solubility of the vulcanizate in a suitable solvent. Such thermal stability is a much desired property in certain applications of such a vulcanizate.

Thus in applications where low vapor pressure and odour and ease of handling are primary considerations but thermal stability is not required, then primary, secondary or tertiary aliphatic amines may be employed. These include amines such as diethylene triamine, triethylene tetramine, tetra-ethylene pentamine, and their partially or completely alkylated derivatives such as methylated and ethylated derivatives.

Where thermal stability is of prime requirement, a heterocyclic amine is much preferred for use in this invention. Suitable heterocyclic amines for this purpose include hexamethylene tetramine, piperazine, 4,4-di-picolylamine, 3,3-di-picolylamine and 1,3-di-4-piperidyl propane. The last three mentioned compounds have been found to be especially useful, particularly in combination with a difunctional chain extending agent, for example 1,3-di-4-pyridyl propane.

Vulcanizates of gum stocks of the compositions prepared by this invention may have tensile strengths of more than 100 p.s.i., and strengths as high as 200–400 p.s.i. or more may be obtained when fillers and other known compounding ingredients are thoroughly mixed into the liquid polymer before vulcanization. Suitable fillers include carbon blacks, finely divided metals, metal oxides, silicas, silicates, carbonates, clays, etc. Low structure high abrasion furnace blacks give particularly good results. Other compounding ingredients include plasticizers, waxes, drying oils, solid or liquid rubbery and resinous polymers, asphaltic and bituminous materials, chlorinated polyphenol resins, antioxidants, antiozonants, ultra-violet absorbers, coloring pigments, etc.

In this specification, the terms "multifunctional" and "polyfunctional" are used interchangeably and have the same meaning.

The following examples will further illustrate the invention. In these examples, all parts are parts by weight unless specified otherwise.

EXAMPLE I 100 parts of butadiene-1,3, 10 parts of tetrabromomethane, 160 parts of water, 5 parts of sodium dodecylbenzene sulfonate, 3 parts of tri-potassium phosphate and 0.5 part of potassium persulfate were charged into a reactor and agitated for one hour at 60° C. An oily product was recovered by subjecting the reactor contents to precipitation with a saturated aqueous barium chloride solution, filtration to remove the water and extraction with acetone and methanol to isolate the desired product. Analysis of this product indicated that it was a compound containing 44 weight percent bromine and having the structure $Br_3C$-(polymerized butadiene-1,3 radical)$_n$-Br where $n$ had an average value of 7.3.

When 20 parts of this compound were charged into a polymerization reactor along with 100 parts of butadiene-1.3, 5 parts of sodium dodecylbenzene sulfonate, 3 parts of tri-potassium phosphate and 3 parts of potassium persulfate and agitated for 19 hours at 60° C. it was found that all of the butadiene-1,3 had become polymerized into the form of a latex. A slowly pourable viscous liquid polymer having terminal allylic bromine in its molecular structure was recoverable from the latex. On mixing with a small amount of polyfunctional amine and standing overnight at room temperature the polymer cured into an elastic product having good strength properties.

EXAMPLE II

When the procedure of Example I was repeated but using 40 parts of tetrabromomethane for the preparation of the oily initial product, this product was found to contain 69.6 weight percent bromine and $n$ average 2.3. When the product was employed in the polymerization of butadiene-1,3 as in Example I a more easily pourable amine-curable liquid polymer was obtained. The polymer had an intrinsic viscosity of 0.13 and a bromine content of 7.7 weight percent. When samples of the polymer were mixed with 3, 5 and 7 parts of N,N,N′,N′ tetramethyl hexamethylene diamine, it was found that each cured to dry elastic masses after 1 hour at room temperature.

When samples of the liquid polymer were mixed with 3, 5 and 7 parts of tetraethylene pentamine and allowed to sit at room temperature overnight, each cured to an elastic state with the respective tensile strengths being 145, 175 and 210 pounds per square inch.

EXAMPLE III 80 parts butadiene-1,3, 10 parts of tetrabromomethane and 1.0 part of benzoyl peroxide were placed into a leakproof container and agitated for 24 hours at 60° C. (140° F.). After degassing and steam stripping for one hour, an oily product was recovered. 20 parts of this oily product along with 100 parts of butadiene-1,3, 180 parts of water, 5 parts of sodium dodecylbenzene sulfonate, 5 parts of tripotassium phosphate and 1.0 part of potassium persulfate were charged into a polymerization reactor and polymerization was allowed to take place for 21 hours at 60° C. Analysis of the resulting latex showed that 70% of the butadiene-1,3 had been converted to liquid polymer. The latex was coagulated by freezing and the liquid polymer product was purified by washing with acetone followed by dissolving in benzene and precipitation with acetone then drying under vacuum at 50° C. 1.25 parts of methylene-bis(2-nonyl-4-methyl phenol) antioxidant were added prior to the vacuum drying step. The liquid polymer had a bound bromine content of 2.74% and an intrinsic viscosity of 0.49 in toluene at 30° C.

On admixture with 1, 2, 3, 4 and 5 parts of a difunctional amine, namely the product obtained by the complete methylation of hexamethylene diamine, i.e. N, N, N', N' tetramethyl hexamethylene diamine per 100 parts of liquid polymer, the polymer mixtures set up to tough, dry, elastic masses within two hours at room temperature. The respective intrinsic viscosities in toluene of these masses were 0.82, 0.76, 0.67, 0.74 and 0.70 and the respective percent solubilities in toluene were 98, 98, 98, 97 and 97. The increase in the intrinsic viscosities shows that chain extension has taken place and therefore the presence of active bromine atoms in the liquid polymers. The development of rubbery properties following cure, together with the observed solubility and intrinsic viscosity behaviour, is illustrative of the essentially difunctional character of the liquid polymers.

When samples of the liquid polymer were admixed with the polyfunctional tetraethylene pentamine in amounts of 1, 2, 3 and 4 parts of the amine per 100 parts of polymer, the samples set up to firm, dry, elastic masses at room temperature.

The respective solubilities in toluene were 16, 9, 11 and 16, thus indicating chain extension and a large degree of cross-linking. The respective tensile strengths were 150, 180, 165 and 95 p.s.i. (pounds per square inch) and the percent elongations at break were 220, 210, 320 and 130 thus showing attractive properties in the cured polymers.

EXAMPLE IV 100 parts of butadiene-1,3 were emulsified in 180 parts of water containing 5 parts of dissolved sodium dodecylbenzene sulfonate emulsifier, 5 parts of dissolved tri-potassium phosphate buffer and 10 parts tetrabromomethane. After raising the temperature of the system to 60° C., 0.6 part of potassium persulfate was added. After agitating the system at this temperature for 65 hours, 95% of the butadiene-1,3 had become converted to polymer. The polymer was recovered from the latex by coagulation with methanol, then purified by dissolving in benzene and precipitating with acetone followed by drying under vacuum at 70° C. 1.25 parts of methylene-bis(2-nonyl-4-methyl phenol) antioxidant were added prior to the vacuum drying step. The dried polymer was a water-white viscous liquid having an intrinsic viscosity in toluene at 30° C. of 0.41 and a combined bromine content of 2.5 weight percent.

On admixture with 2.0 parts of the difunctional methylated hexamethylene diamine per 100 parts of liquid polymer, the polymer set up to a firm, dry, elastic mass within two hours at room temperature. The product was, however, completely soluble in benzene and intrinsic viscosity determinations showed a substantial increase in molecular weight.

On admixture of the liquid polymer with 3.0 parts of the multifunctional tetraethylene pentamine per 100 parts by weight of polymer, the liquid polymer set up to a firm, dry, elastic mass at room temperature but the product this time was 91% insoluble in benzene and had a tensile strength of 135 pounds per square inch.

EXAMPLE V 100 parts of butadiene-1,3 10 parts of tetrabromomethane were emulsified in 160 parts of water containing 5 parts of dissolved sodium dodecylbenzene sulfonate emulsifier and 5 parts of dissolved tri-potassium phosphate buffer in a polymerization reactor. After raising the temperature of the system to 60° C., 0.6 part of potassium persulfate was added and the emulsion was stirred for 21 hours at which time 28% of the butadiene-1,3 had become converted to polymer in the form of an aqueous latex. Unreacted butadiene-1,3 was removed from the latex which was then diluted with a further 60 parts of water and divided into two portions. One portion was heated for a further 17 hours at 60° C. while the second portion was held unheated. Each portion of the latex was then coagulated by freezing and the recovered polymer was purified by dissolving in benzene, precipitating with acetone and drying under vacuum at 50° C. Prior to the drying step, 1.25 parts of methylene-bis(2-nonyl-4-methyl phenol) antioxidant was added to each polymer sample. Both polymer samples were viscous pourable liquids of similar appearance and viscosity. The bromine content of each polymer sample was determined and a portion of each sample was mixed with 3 parts of completely methylated hexamethylene diamine (MHMDA) and allowed to cure at room temperature and the tensile strength, elongation and modulus of the cured specimens were measured.

TABLE I

| | Heated | Not Heated |
|---|---|---|
| Bromine, weight percent | 4.70 | 2.66 |
| Tensile strength, p.s.i. | 380 | 115 |
| Elongation at break, percent | 700 | 515 |
| Modulus at 100%, p.s.i. | 130 | 85 |

These results show the improved strength properties obtained on post-heating of low conversion liquid polymers.

EXAMPLE VI

A number of polymerizations were carried out where 100 parts of butadiene-1,3 were emulsified in 180 parts of water containing 5 parts of dissolved sodium dodecylbenzene sulfonate and 3 parts of dissolved tri-potassium phosphate and polymerized for 17 hours at 60° C. in the presence of 3 parts of potassium persulfate and various amounts of tetrabromomethane. The results are recorded in Table II.

TABLE II

| Experiment No. | Tetrabromomethane, parts | Intrinsic Viscosity | Bromine, wt. percent | Remarks |
|---|---|---|---|---|
| 1 | 2.5 | 1.3 | | Solid polymer. |
| 2 | 5.0 | 0.77 | 1.4 | Curable liquid. |
| 3 | 8.0 | 0.51 | 1.9 | Do. |
| 4 | 10.0 | 0.37 | 3.3 | Do. |
| 5 | 15.0 | 0.26 | 3.9 | Do. |

These results show that the intrinsic viscosities and molecular weights of the polymers decreased and the bromine contents increased with increasing amounts of tetrabromomethane. They also show that 2.5 parts of tetrabromomethane are insufficient to produce a liquid polymer. The polymers obtained from Experiments 2-5 were converted to tough, elastic products on mixing with small amounts of methylated hexamethylene diamine and standing at room temperature for a few hours. When the polymer from Experiment No. 2 was mixed with 40 parts of a high abrasion furnace carbon black and 2 parts of tetraethylene pentamine, formed into a sheet and allowed to stand at room temperature overnight and subsequently tested to determine its physical properties it was found to have developed a tensile strength of 1080 p.s.i., elongation of 360% at break and a modulus of 805 p.s.i. at an elongation of 300%.

EXAMPLE VII

A number of polymerizations were carried out with various polymerizable monomers, varying component ratios and polymerization conditions. The results are recorded in Table III. All polymers were liquid and curable with polyfunctional amines. Table IV illustrates some of the results obtained with tetraethylene pentamine curing agent. Triethyl trimethylene triamine was the curing agent used for sample No. 9 and in this case no numerical values were determined for tensile strength and elongation—the cured specimen was merely tested by hand and was found to be elastic and highly extensible after airing at 144° C. for 25 minutes.

content of 3.45 weight percent. Samples of the polymer were compounded with various fillers and allowed to cure at room temperature. All compounds had cured sufficiently to be tack-free after 1 hour. After 7 days, the tensile strength and elongation of each sample were determined. The results are recorded in Table V.

TABLE V

| Sample No. | 1 | 2 | 3 | 4 | 5 | 6 | 7 | 8 |
|---|---|---|---|---|---|---|---|---|
| Polymer | 100 | 100 | 100 | 100 | 100 | 100 | 100 | 100 |
| Carbon black: | | | | | | | | |
| FT | | | 40 | | | | | |
| SRF | | | | | 30 | | | |
| LS-HAF | | | | 25 | | | | |
| HAF | | | | | | 25 | | |
| Kaolin | | | | | | | 60 | |
| Powdered aluminium | | | | | | | | 8 |
| Curing agent [1] | 2 | | | | | | | 0.25 |
| Curing agent [2] | | 3 | 2.5 | 2.5 | 2.5 | 2.5 | 2.5 | |
| Tensile strength (p.s.i.) | 205 | 470 | 580 | 935 | 1,025 | 850 | 645 | 315 |
| Elongation (percent) | 710 | 1,130 | 960 | 750 | 810 | 630 | 1,000 | 1,085 |

[1] N, N, N', N' tetramethyl hexamethylene diamine.
[2] N, N, N', N'', N''', N''', hexamethyl triethylene tetramine.
FT—Fine thermal.
SRF—Semi-reinforcing furnace.
LS-HAF—Low structure high abrasion furnace.
HAF—High abrasion furnace.

TABLE III

| No. | Monomer | Water | Emulsifier | Buffer | Initiator | Halogen Compound | Reaction Time, hrs. | Temp., °C. | Intrinsic Viscosity | Halogen, wt. percent |
|---|---|---|---|---|---|---|---|---|---|---|
| 1 | Butadiene-1,3 (100) | 180 | (a) 5 | $K_3PO_4$ 4 | $K_2S_2O_8$ 0.20 | $CBr_4$ 10 | 65 | 60 | 0.40 | 2.7 |
| 2 | Butadiene-1,3 (100) | 180 | (b) 5 | $K_3PO_4$ 4 | $K_2S_2O_8$ 0.40 | $CBr_4$ 10 | 65 | 60 | 0.51 | 2.17 |
| 3 | Butadiene-1,3 (100) | 180 | (a) 5 | $K_3PO_4$ 3 | $K_2S_2O_8$ 3.0 | $CBr_4$ 20 | 17 | 60 | 0.24 | 5.54 |
| 4 | Butadiene-1,3 (100) | 180 | (a) 5 | $K_3PO_4$ 3 | $K_2S_2O_8$ 1.0 | $CBr_4$—10 n-DDM—0.2 | 25 | 50 | | 2.01 |
| 5 | Butadiene-1,3 (100) | 160 | (a) 5 | $K_3PO_4$ 3 | DIP 1.0 | $CBr_4$ 10 | 47 | 60 | 0.32 | 7.2 |
| 6 | Butadiene-1,3 (100) | 360 | (a) 10 | $K_3PO_4$ 3 | DIP (c) 1.0 | $CBr_4$ 10 | 65 | 13 | 0.50 | 1.5 |
| 7 | Butadiene-1,3 (100) | 360 | (a) 5 | $K_3PO_4$ 7.5 | $K_2S_2O_8$ 0.6 | $CBr_4$ 40 | 76 | 60 | 0.13 | 7.7 |
| 8 | Butadiene-1,3 (100) | 160 | (a) 5 | $K_3PO_4$ 3 | ABIN 2.0 | $CBr_4$ 10 | 21 | 60 | | |
| 9 | Butadiene-1,3 (50) Styrene (50) | 180 | (a) 5 | | DIP 0.4 | $CCl_4$ 108 | 17 | 80 | 0.3 | |
| 10 | Butadiene-1,3 (50) Styrene (50) | 180 | (a) 5 | $Na_3PO_4$ 5 | $K_2S_2O_8$ 1.0 | $CBr_4$ 20 | 17 | 80 | 0.1 | 3.5 |
| 11 | Butadiene-1,3 (50) Methyl methacrylate (50) | 180 | (a) 5 | $K_3PO_4$ 4 | $K_2S_2O_8$ 0.2 | $CBr_4$ 10 | 65 | 60 | 0.30 | 1.94 |
| 12 | Butadiene-1,3 (85) Acrylonitrile (15) | 180 | (a) 5 | $K_3PO_4$ 4 | $K_2S_2O_8$ 3.0 | $CBr_4$ 10 | 17 | 60 | 0.37 | 4.39 |
| 13 | Isoprene (100) | 180 | (a) 5 | $K_3PO_4$ 4 | $K_2S_2O_8$ 1.0 | $CBr_4$ 10 | 65 | 60 | 0.19 | 3.15 |
| 14 | Butadiene-1,3 (100) | 180 | (a) (5) | $K_3PO_4$ 3 | $K_2S_2O_8$ 3.0 | $CHI_3$ 10 | 17 | 60 | 0.16 | 8.04 |
| 15 | Isoprene (100) | 180 | (a) 5 | $K_3PO_4$ 5 | $K_2S_2O_8$ 10.0 | $CBr_4$ 10 | 41 | 60 | | 3.9 |

DIP—Di-isopropylbenzene hydroperoxide.
n-DDM—Normal-dodecyl mercaptan.
ABIN—Azo-bis-isobutyronitrile:
(a)—Sodium dodecylbenzene sulfonate.
(b)—Potassium stearate.
(c)—Activated with $Na_3PO_4$—0.48 parts; $FeSO_4 \cdot 7H_2O$—0.12 parts; sodium formaldehyde sulfoxylate—0.48 parts; ethylene diamine tetra-sodium acetate—0.15 parts.

TABLE IV

| Sample | Curing Agent (parts) | Cure Time | Tensile Strength (p.s.i.) | Elongation (percent) |
|---|---|---|---|---|
| 1 | 2 | Overnight | 145 | 240 |
| 3 | 4 | do | 165 | 215 |
| 5 | 2 | do | 125 | 820 |
| 6 | 2 | do | 110 | 760 |
| 7 | 3 | do | 145 | 160 |
| 9 | 7.5 | 25 min. at 144° C. | Not measured | |
| 10 | 3 | 7 days | 110 | 295 |
| 11 | 3 | 6 hrs | 150 | 480 |
| 12 | 3 | Overnight | 130 | 145 |
| 14 | 3 | 2 hrs | 155 | 220 |

EXAMPLE VIII

A liquid homopolymer was prepared as in Example IV except that in the present case 15 parts of tetrabromomethane were used. The polymer had a bulk viscosity of 335 poise, an intrinsic viscosity of 0.29 and a bromine

EXAMPLE IX 100 parts of butadiene-1,3 and 10 parts of tetrabromomethane were emulsified in 160 parts of water containing 5 parts of dissolved sodium dodecylbenzene sulfonate emulsifier and 5 parts of dissolved tri-potassium phosphate buffer in a polymerization reactor. After raising the temperature of the system to 60° C., 0.6 part of potassium persulfate was added and the polymerization reaction was allowed to proceed to over 95% conversion of the monomer to liquid polymer in the form of an aqueous latex. The recovered liquid polymer had a viscosity of 4600 poise at 25° C., an intrinsic viscosity of 0.38 and a bromine content of 3.72 weight percent. Samples of the recovered polymer were compounded with various materials and vulcanized and the vulcanizates were tested as shown in Table VI. In the case of Sample 1, the hydrocarbon oil was a paraffinic oil and the polyethylene, which was a low density material having a melt index of 25, was dissolved in it at 150° C. This was added to the polymer together with the filler and the mixture was passed repeatedly through a 3-roll paint mill until a thorough blending was obtained. The toluene and amine curative (N, N, N', N' tetramethyl hexamethylene diamine) were added as a solution. The resulting compounds prior to curing were soft, thixotropic, easily spreadable compositions suitable for use as sealants or caulking compounds.

TABLE VI

| Sample No. | 1 | 2 | 3 |
|---|---|---|---|
| Polymer | 100 | 100 | 100 |
| Hydrocarbon oil | 40 | | |
| Chlorinated polyphenyl (liquid) | | 40 | 40 |
| Polyethylene | 10 | 10 | 10 |
| Carbon black (SRF) | 40 | | |
| Titanium dioxide | | 20 | |
| Aluminium powder | | | 10 |
| Toluene | 10 | 10 | 10 |
| Amine | 2.5 | 2.5 | 2.5 |
| Cure temperature | Room | Room | Room |
| Cure time | 7 days | 7 days | 7 days |
| Tensile strength (p.s.i.) | 400 | 290 | 230 |
| Elongation (percent) | 630 | 900 | 790 |
| Modulus at 100% (p.s.i.) | 140 | 120 | 135 |

EXAMPLE X

A liquid homopolymer was prepared as in Example IX except that in the present instance 200 parts of water were used. The polymer had an intrinsic viscosity of 0.24 and a bromine content of 5.7 weight percent.

Mixtures of a minor amount of a vulcanizing agent and a major amount of a difunctional chain extending agent were added to the polymer. Two compounds were prepared. Compound 1 consisted of 0.5 part of 2,4,6-tri(dimethyl amino methyl) phenol, 2.0 parts of 1,3 di-4-pyridyl propane and 100 parts of liquid polymer. Compound 2 was similar to Compound 1 except that the vulcanizing agent used in place of 2,4,6-tri(dimethyl amino methyl) phenol was N, N, N', N'', N''', N''', hexamethyl triethylene tetramine. The vulcanizing and chain extending agents were added as 50% solutions in toluene in order to obtain a better dispersion in the polymer.

The "pot life," that is the time taken for a mix to thicken to an unworkable condition, was determined for each compound. The stress-strain properties were measured after a vulcanization period of 7 days at 25° C.

The properties of the compound and vulcanizates are presented in Table VII.

TABLE VII

| Property | Compound 1 | Compound 2 |
|---|---|---|
| Pot Life (hours) | 3 | 1 |
| Tensile Strength (p.s.i.) | 275 | 375 |
| Elongation (percent) | 680 | 730 |
| Modulus at 100% elongation (p.s.i.) | 95 | 95 |
| Modulus at 300% elongation (p.s.i.) | 155 | 155 |

The results show that these compounds, and Compound 1 in particular, would be suitable for use as sealants in the construction industry where a pot life of at least one hour is required. This may be obtained, as in this example, by the use of a mixture comprising a minor amount of a polyfunctional vulcanizing agent and a major amount of a difunctional chain extending agent. A pot life of 10–15 minutes which is obtained when the curvature system is based solely on a major amount of a polyfunctional vulcanizing agent would be unacceptable for this particular application.

EXAMPLE XI 100 part portions of the liquid polymer of Example IX were mixed with 5 parts of basic lead carbonate and varying amounts respectively of each of the five heterocyclic amines identified in Table VIII. In addition, a control sample was prepared employing a tertiary aliphatic amine in place of a heterocyclic amine. The "pot life" for each mixture was determined.

After curing, the vulcanizates were tested for elongation set and resistance to ageing. The elongation set test consisted of heating a sample to 100° C., extending to 100% elongation, cooling to 25° C., releasing and measuring the length after one minute; "elongation set" is defined as the percentage increase in length of the specimen after such testing. Thermal stability was determined by measuring the solubility of the vulcanizate, in toluene at room temperature, before and after heating at 150° C. for 3 hours under nitrogen.

All data are listed in the following Table VIII and show the marked improvement in thermal stability afforded by the vulcanizates prepared with each of the heterocyclic amine compounds. In each of the vulcanizates prepared with a heterocyclic amine, the solubility after heat treatment was equal or less than the solubility before heat treatment, whereas in the case of the vulcanizate prepared with the aliphatic amine, a pronounced loss in insolubility as experienced.

TABLE VIII

| | Experimental | | | | | | Control |
|---|---|---|---|---|---|---|---|
| | #1 | #2 | #3 | #4 | #5 | #6 | |
| Amine Compound | Hexamethylene tetramine | Piperazine | 4,4-dipicolyl amine | 3,3-dipicolyl amine | 1,3-di-4-piperidyl propane | Triethylene diamine | Methylated diethylene triamine |
| Amount of amine, parts | 4.6 | 2.0 | 3.0 | 2.5 | 3.0 | 1.5 | 2.25 |
| Cure time at 122° C., minutes | 5 | 20 | 20 | 20 | 10 | 40 | 20 |
| Vulcanizate properties: | | | | | | | |
| Tensile strength, p.s.i. | 220 | 160 | 370 | 400 | 250 | 315 | 815 |
| Elongation at break, percent | 320 | 890 | 380 | 600 | 440 | 400 | 1,170 |
| Modulus at 100%, p.s.i. | 100 | 30 | 160 | 140 | 100 | 170 | 125 |
| Set, percent | 9 | 12 | 19 | 25 | 12 | 37 | 56 |
| Solubility before heat treatment, percent | 10.5 | 41.4 | 8.6 | 9.6 | 10.5 | 28.3 | 12.2 |
| Solubility after heat treatment, percent | 10.2 | 15.6 | 8.0 | 7.1 | 9.9 | 18.8 | 22.3 |

NOTE.—In addition, uncured experimental compositions #1–5 had a pot life of from 4 to 6 hours by comparison to the short pot life of the control composition of 10 minutes.

EXAMPLE XII

Vulcanizates of liquid polymer were prepared as in the preceding example except that in addition to employing 5 parts basic lead carbonate and a heterocyclic amine, namely hexamethylene tetramine, there was also incorporated into the mixture before vulcanizing varying amounts of the chain extending agent 1,3-di-4-pyridyl propane. The amounts of each ingredient per 100 parts of liquid polymer are shown in Table IX, as are the temperature-time conditions of cure. Test values of the vulcanizates show good thermal stability as well as excellent stress-strain properties.

TABLE IX

| Amount of hexamethylene tetramine, parts | 3.0 | 0.5 |
|---|---|---|
| Amount of 1,3-di-4-pyridyl propane, parts | 1.7 | 2.0 |
| Cure temperature, ° C. | 166 | 122 |
| Cure time, minutes | 40 | 40 |
| Tensile strength of vulcanizate, p.s.i. | 300 | 365 |
| Elongation, percent | 390 | 480 |
| Modulus at 100% elongation, p.s.i. | 95 | 125 |
| Solubility before heat treatment, percent | 20.8 | 14.0 |
| Solubility after heat treatment, percent | 15.1 | 9.5 |

What is claimed is:

1. An aqueous emulsion polymerized undegraded olefinically unsaturated unvulcanized liquid polymer of a $C_4$–$C_8$ diolefinic hydrocarbon compound, a major proportion of molecules of said polymer being characterized by the presence of two separated and terminally located allylic bromide groups within their structures, said liquid polymer being characterized by an intrinsic viscosity within the range of 0.04–1.0 when measured in toluene at 30° C.

2. A liquid polymer of claim 1 in which the intrinsic viscosity of the liquid polymer is within the range of 0.05–0.6.

3. A liquid polymer of claim 2 in which the liquid polymer is selected from homopolymers and copolymers of butadiene-1,3, said copolymers comprising a major proportion of butadiene-1,3 copolymerized with a minor proportion of a comonomer selected from acrylic acid ester, acrylic acid nitrile and vinyl aromatic compounds.

4. A liquid polymer of claim 3 containing 5–20 parts by weight of a material which imparts thixotropic properties to the unvulcanized liquid polymer selected from polyethylene, polypropylene and trans-polyisoprene.

5. A process which comprises polymerizing a monomer system comprising a $C_4$–$C_8$ diolefinic hydrocarbon compound under aqueous emulsion polymerization conditions in the presence of at least 0.15 mole per 100 moles of monomer, of a compound of the type $Br(Y)CBr_3$ where Y is a hydrocarbon radical comprising a $C_4$–$C_8$ diolefinic hydrocarbon compound monomer unit and having a molecular weight of from 54 up to about 1000, said radical Y being such that the group $Br(Y)$— contains a terminal allylic bromide group, to obtain a latex of a liquid polymer of said $C_4$–$C_8$ diolefinic hydrocarbon compound, said liquid polymer being characterized by an intrinsic viscosity within the range of 0.04–1.0 when measured in toluene at 30° C.

6. A process of claim 5 including the step of recovering the liquid polymer by subjecting the latex to a stripping step to remove any unreacted monomer, a coagulation step to separate the liquid polymer from the water, a purification step to remove low molecular weight monofunctional molecules by treatment with a solvent which is capable of dissolving only the said low molecular weight monofunctional molecules and not the higher molecular weight difunctional liquid polymer molecules, and a drying step.

7. A process of claim 6 in which the monomer system is selected from butadiene-1,3 and mixtures comprising a major proportion of butadiene-1,3 and a minor proportion of a monomer selected from acrylic acid ester, acrylic acid nitrile and vinyl aromatic compounds, Y is a polybutadiene-1,3 radical of from 2 to 10 polymerized butadiene-1,3 units in length and the amount of the $Br(Y)CBr_3$ compound employed is 0.5–6.5 moles per 100 moles of monomer.

8. A process of claim 7 in which the polymerization of the monomer system is initiated and carried out at 45–80° C. by the thermal decomposition of a compound selected from sodium persulfate and potassium persulfate.

9. A process of claim 7 in which the polymerization of the monomer system is initiated and carried out at 5–45° C. using an organic hydroperoxide as initiator activated by a reducing agent at a water/monomer ratio in the range of about 3–4/1.

10. A vulcanizate comprising the reaction product of (a) the liquid polymer of claim 1 and (b) a polyfunctional vulcanizing agent, capable of reacting with said halogen atoms to cause a joining together of said polymer molecules.

11. The vulcanizate of claim 10 in which the polyfunctional vulcanizing agent comprises at least one of an aliphatic amine, aromatic amine, or mixture thereof.

12. The vulcanizate of claim 11 wherein the polyfunctional vulcanizing agent further comprises a difunctional chain extending agent.

13. The vulcanizate of claim 10 in which the polyfunctional vulcanizing agent comprises at least one heterocyclic amine.

14. The vulcanizate of claim 13 wherin the polyfunctioaln vulcanizing agent further comprises a difunctional chain extending agent.

15. The vulcanizate of claim 14 wherein the heterocyclic amine is selected from 4,4-di-picolylamine, 3,3-di-picolylamine, and 1,3-di-4-piperidyl propane, and where the difunctional chain extending agent is 1,3-di-4-pyridyl propane.

16. The vulcanizate of claim 12 wherein the polyfunctional vulcanizing agent comprises at least one tertiary aliphatic amine.

References Cited

UNITED STATES PATENTS

| | | | |
|---|---|---|---|
| 1,898,522 | 2/1933 | Bock et al. | 260—82.1 |
| 2,401,099 | 5/1946 | Peterson | 260—654 |
| 2,463,225 | 3/1949 | Vincent | 260—82.1 |
| 2,518,573 | 8/1950 | Scott | 260—94.2 |

SAMUEL H. BLECH, Primary Examiner

W. J. BRIGGS, Assistant Examiner

U.S. Cl. X.R.

260—29.7, 33.8, 28.5, 41.5, 45.95, 82.1, 82.3, 83.3, 83.5, 83.7, 85.1, 94.2, 94.7, 894, 655

UNITED STATES PATENT OFFICE
CERTIFICATE OF CORRECTION

Patent No. 3,506,742                                      April 17, 1970

Ernest Jack Buckler et al.

It is certified that error appears in the above identified patent and that said Letters Patent are hereby corrected as shown below:

Column 1, line 46, "product" should read -- products --; line 50, "previosuly" should read -- previously --. Column 2, line 26, "-Cl$_3$" should read -- -CI$_3$ --; line 27, ">Cl$_2$" should read -->CI$_2$ --. Column 4, lines 23 and 24, "polymerizatioin" should read -- polymerization --. Column 12, line 2, "curvature" should read -- curative --; line 29, after "equal" insert -- to --; line 32, "as" should read -- was --.

Signed and sealed this 12th day of January 1971.

(SEAL)
Attest:

Edward M. Fletcher, Jr.                             WILLIAM E. SCHUYLER, JR.
Attesting Officer                                                Commissioner of Patents